(12) United States Patent
Walsh et al.

(10) Patent No.: US 8,165,078 B2
(45) Date of Patent: Apr. 24, 2012

(54) SYSTEM AND METHOD FOR CONTROLLING USE OF A NETWORK RESOURCE

(75) Inventors: Michael Walsh, San Francisco, CA (US); Ravi Keswani, Fremont, CA (US); Manicka Babu, Fremont, CA (US); Nahrin Reihaneh, San Jose, CA (US); Bingwu Li, Sunnyvale, CA (US)

(73) Assignee: Coupons.com Incorporated, Mountain View, CA (US)

( * ) Notice: Subject to any disclaimer, the term of this patent is extended or adjusted under 35 U.S.C. 154(b) by 19 days.

(21) Appl. No.: 12/274,348

(22) Filed: Nov. 19, 2008

(65) Prior Publication Data

US 2010/0124235 A1    May 20, 2010

(51) Int. Cl.
*G06Q 30/00*    (2006.01)
(52) U.S. Cl. ................ 370/329; 370/437; 705/14.26
(58) Field of Classification Search .................. None
See application file for complete search history.

(56) References Cited

U.S. PATENT DOCUMENTS

| | | | |
|---|---|---|---|
| 4,723,212 A | 2/1988 | Mindrum et al. | |
| 4,791,281 A | 12/1988 | Johnsen et al. | |
| 4,882,675 A | 11/1989 | Nichtberger et al. | |
| 4,896,791 A | 1/1990 | Smith | |
| 4,910,672 A | 3/1990 | Off et al. | |
| 4,926,255 A | 5/1990 | Von Kohorn | |
| 4,949,256 A | 8/1990 | Humble | |
| 5,034,807 A | 7/1991 | Von Kohorn | |
| 5,056,019 A | 10/1991 | Schultz et al. | |
| 5,057,915 A | 10/1991 | Von Kohorn | |
| 5,245,533 A | 9/1993 | Marshall | |
| 5,283,731 A | 2/1994 | Lalonde | |
| 5,283,734 A | 2/1994 | Von Kohorn | |
| 5,285,278 A | 2/1994 | Holman | |
| 5,287,181 A | 2/1994 | Holman | |
| 5,305,195 A | 4/1994 | Murphy | |
| 5,305,197 A | 4/1994 | Axler et al. | |
| 5,353,218 A | 10/1994 | De Lapa et al. | |
| 5,361,871 A | 11/1994 | Gupta | |
| 5,368,129 A | 11/1994 | Von Kohorn | |
| 5,380,991 A | 1/1995 | Valencia et al. | |

(Continued)

FOREIGN PATENT DOCUMENTS

EP    0 512 509 B1    11/1992

(Continued)

OTHER PUBLICATIONS

European Patent Office, "European Search Report", application No. EP 08170408, dated May 20, 2009, 7 pages.

(Continued)

*Primary Examiner* — Jianye Wu
(74) *Attorney, Agent, or Firm* — Hickman Palermo Truong & Becker LLP

(57) ABSTRACT

A system includes a control source that is provided on a server and control logic that executes on a terminal. The control logic executes on a terminal to (i) identify a plurality of attributes on the terminal, the attributes including an identifier for each of a plurality of terminal assets that include one or more of a hardware fixture, firmware, or operating system; and (ii) generate signature data from the plurality of attributes. The control source is configured to make a determination from the signature data as to whether the terminal is known or unknown.

32 Claims, 5 Drawing Sheets

U.S. PATENT DOCUMENTS

| | | | |
|---|---|---|---|
| 5,401,946 A | 3/1995 | Weinblatt | |
| 5,420,606 A | 5/1995 | Begum | |
| 5,459,306 A | 10/1995 | Stein et al. | |
| 5,483,049 A | 1/1996 | Schulze, Jr. | |
| 5,488,423 A | 1/1996 | Walkingshaw et al. | |
| 5,500,681 A | 3/1996 | Jones | |
| 5,502,636 A | 3/1996 | Clarke | |
| 5,504,519 A | 4/1996 | Remillard | |
| 5,508,731 A | 4/1996 | Von Kohorn | |
| 5,509,070 A | 4/1996 | Schull | |
| 5,528,490 A | 6/1996 | Hill | |
| 5,557,721 A | 9/1996 | Fite et al. | |
| 5,594,910 A | 1/1997 | Filepp | |
| 5,604,542 A | 2/1997 | Dedrick | |
| 5,612,527 A | 3/1997 | Ovadia | |
| 5,636,346 A | 6/1997 | Saxe | |
| 5,642,485 A | 6/1997 | Deaton | |
| 5,687,322 A | 11/1997 | Deaton et al. | |
| 5,697,844 A | 12/1997 | Von Kohorn | |
| 5,708,782 A | 1/1998 | Larson et al. | |
| 5,710,884 A | 1/1998 | Dedrick | |
| 5,710,886 A | 1/1998 | Christensen et al. | |
| 5,713,795 A | 2/1998 | Von Kohorn | |
| 5,715,314 A | 2/1998 | Payne | |
| 5,724,521 A | 3/1998 | Dedrick | |
| 5,759,101 A | 6/1998 | Von Kohorn | |
| 5,761,648 A | 6/1998 | Golden et al. | |
| 5,761,683 A | 6/1998 | Logan et al. | |
| 5,774,869 A | 6/1998 | Toader | |
| 5,791,991 A | 8/1998 | Small | |
| 5,794,210 A | 8/1998 | Goldhaber et al. | |
| 5,821,512 A | 10/1998 | O'Hagan et al. | |
| 5,822,735 A | 10/1998 | De Lapa et al. | |
| 5,845,302 A | 12/1998 | Cyman, Jr. | |
| 5,848,396 A | 12/1998 | Gerace | |
| 5,855,007 A | 12/1998 | Jovicic | |
| 5,884,033 A | 3/1999 | Duvall | |
| 5,903,874 A | 5/1999 | Leonard et al. | |
| 5,907,830 A | 5/1999 | Engel et al. | |
| 5,916,024 A | 6/1999 | Von Kohorn | |
| 5,918,211 A | 6/1999 | Sloane | |
| 5,918,213 A | 6/1999 | Bernard et al. | |
| 5,969,678 A | 10/1999 | Stewart | |
| 5,979,757 A | 11/1999 | Tracy et al. | |
| 6,002,771 A | 12/1999 | Nielsen | |
| 6,006,269 A | 12/1999 | Phaal | |
| 6,009,411 A | 12/1999 | Kepecs | |
| 6,009,441 A | 12/1999 | Kepecs | |
| 6,014,634 A | 1/2000 | Scroggie et al. | |
| 6,018,748 A | 1/2000 | Smith | |
| 6,045,310 A | 4/2000 | Miller et al. | |
| 6,055,510 A | 4/2000 | Henrick et al. | |
| 6,129,276 A | 10/2000 | Jelen et al. | |
| 6,134,532 A | 10/2000 | Lazarus et al. | |
| 6,185,541 B1 | 2/2001 | Scroggie et al. | |
| 6,278,979 B1 | 8/2001 | Williams | |
| 6,292,786 B1 | 9/2001 | Deaton et al. | |
| 6,298,329 B1 | 10/2001 | Walker et al. | |
| 6,298,446 B1 | 10/2001 | Schreiber et al. | |
| 6,321,208 B1 | 11/2001 | Barnett et al. | |
| 6,332,127 B1 | 12/2001 | Bandera et al. | |
| 6,336,099 B1 | 1/2002 | Barnett et al. | |
| 6,360,254 B1 | 3/2002 | Linden et al. | |
| 6,377,935 B1 | 4/2002 | Deaton et al. | |
| 6,377,986 B1 | 4/2002 | Philyaw et al. | |
| 6,385,591 B1 | 5/2002 | Mankoff | |
| 6,408,286 B1 | 6/2002 | Heiden | |
| 6,418,472 B1 | 7/2002 | Mi et al. | |
| 6,434,530 B1 | 8/2002 | Sloane et al. | |
| 6,484,939 B1 | 11/2002 | Blaeuer | |
| 6,615,179 B1 | 9/2003 | McNicol et al. | |
| 6,638,316 B1 | 10/2003 | Tyler et al. | |
| 6,687,346 B1 | 2/2004 | Swartz et al. | |
| 6,915,271 B1 | 7/2005 | Meyer et al. | |
| 7,032,030 B1 | 4/2006 | Codignotto | |
| 7,089,195 B2 | 8/2006 | Rosenberg | |
| 7,231,357 B1 | 6/2007 | Shanman et al. | |
| 7,933,984 B1 | 4/2011 | Smith et al. | |
| 2002/0073046 A1 | 6/2002 | David | |
| 2002/0138345 A1* | 9/2002 | Dickson et al. | 705/14 |
| 2002/0178051 A1 | 11/2002 | Golden et al. | |
| 2002/0184088 A1 | 12/2002 | Rosenberg | |
| 2002/0194069 A1 | 12/2002 | Thakur et al. | |
| 2003/0083931 A1 | 5/2003 | Lang | |
| 2003/0097593 A1* | 5/2003 | Sawa et al. | 713/201 |
| 2003/0117635 A1 | 6/2003 | Roberts | |
| 2004/0039704 A1 | 2/2004 | Gilliam et al. | |
| 2004/0098304 A1 | 5/2004 | Truong et al. | |
| 2004/0141611 A1* | 7/2004 | Szrek et al. | 380/28 |
| 2004/0193487 A1 | 9/2004 | Purcell et al. | |
| 2004/0230476 A1 | 11/2004 | Messer | |
| 2004/0230485 A1 | 11/2004 | Barnett et al. | |
| 2005/0149404 A1 | 7/2005 | Barnett | |
| 2005/0149613 A1 | 7/2005 | Amjadi | |
| 2005/0239448 A1 | 10/2005 | Bayne | |
| 2005/0262005 A1 | 11/2005 | Woolston | |
| 2006/0026067 A1* | 2/2006 | Nicholas et al. | 705/14 |
| 2006/0122883 A1 | 6/2006 | Lynn | |
| 2006/0143307 A1 | 6/2006 | Codignotto | |
| 2006/0143477 A1* | 6/2006 | Stevens | 713/193 |
| 2006/0212350 A1 | 9/2006 | Ellis et al. | |
| 2006/0224457 A1 | 10/2006 | Rosenberg | |
| 2007/0033106 A1 | 2/2007 | Mason | |
| 2007/0073579 A1 | 3/2007 | Immorlica et al. | |
| 2007/0156528 A1 | 7/2007 | Hopp et al. | |
| 2007/0288313 A1 | 12/2007 | Brodson et al. | |
| 2007/0293200 A1* | 12/2007 | Roundtree et al. | 455/414.1 |
| 2008/0163128 A1 | 7/2008 | Callanan et al. | |
| 2008/0183576 A1* | 7/2008 | Kim et al. | 705/14 |
| 2008/0208688 A1* | 8/2008 | Byerley et al. | 705/14 |
| 2008/0267500 A1* | 10/2008 | Keswani et al. | 382/173 |
| 2010/0205059 A1 | 8/2010 | Yehoshua et al. | |
| 2011/0153410 A1 | 6/2011 | Muthugopalakrishnan et al. | |

FOREIGN PATENT DOCUMENTS

| | | |
|---|---|---|
| JP | 2002/298052 A | 10/2002 |
| WO | WO 95/01060 | 1/1995 |
| WO | WO 97/23838 | 7/1997 |
| WO | WO 2007/048063 | 4/2007 |
| WO | WO 2007/048063 A2 | 4/2007 |

OTHER PUBLICATIONS

Claims, application No. EP 08170408, 4 pages.

"Acu-Trac and Cox Launch Interactive Couponing Service," Electronic Marketplace Report, IAC Newsletter Database, Information Access Company, Mar. 21, 1995, 2 pages.

Douglass, "Cruising for Food Savings on Internet," The San Diego Union-Tribune, Apr. 20, 1996, Section: Business, p. C1, 2 pages.

"Emaginet plans to 'push' its way into consumer mindset, pocketbook," Interactive Marketing News, vol. 4, No. 22, May 30, 1997, 2 pages.

Freitag, "In this Computer Age, Who Needs Coupons?," The New York Times, Jun. 15, 1989 —p. A1 (2 pages).

Graham, I., "The HTML Sourcebook, 2$^{nd}$ edition, A Complete Guide to HTML 3.0", Wiley Publishing Company, 1996, pp. 233-234.

ImageSafe, "ImageSaft-Image copy protection," undated, 3 pages. http://www.cellspark.com/imagesafe.html.

Spethmann, "Coupons Shed Low-Tech Image," Brandweek, Oct. 24, 1994, pp. 30-31. http://login.vnuemedia.com/bw/esearch/article_display.jsp?vnu_content_id=546705.

Sutherland, "Promotion Profile," Marketing & Media Decisions, vol. 24, No. 10, Oct. 1989, pp. 103(1).

Tanner, "A New Dimension in Marketing", Progressive Grocer, May 1987, pp. 133, 134 & 136.

"Tracking Shoppers with Personal Bar Codes," The New York Times, Jun. 18, 1989.

"Ukrop's Tests Data Base Marketing Program Electronic Couponing Tracks Buying Behavior of Valued Customers," Chain Store Age Executive, Sep. 1987, pp. 73-75.

Wilkies, "Catalina, Coupons Online in Tests," Advertising Age, Aug. 28, 1995, p. 15.

Anderson, "CoolSavings.com Settles Patent-Infringement Suit," The Industry Standard Magazine, Jan. 13, 2000, 2 pages. http://archives.cnn.com/2000/TECH/computing/04/03/coupon.patent.idg/index.html.

Anderson, "Online-coupon companies battle over patents," CNN.com—Technology, Apr. 3, 2000, 4 pages. http://web.archive.org/web/20010712032039/www.thestandard.com/article/0,1902,8853,00.html?

Wolverton, "Coolsavings settles e-coupon patent dispute," CNET News, Jul. 10, 2000, 2 pages. http://news.cnet.com/Coolsavings-settles-e-coupon-patent-dispute/2100-1017_3-242969.html?tag=mncol.

Wolverton, "Coolsavings settle patent suite," CNET News, Dec. 13, 2000, 2 pages. http://news.cnet.com/Coolsavings-settles-patent-suit/2100-1017_3-249876.html?tag=mncol.

European Office Action received in Application No. 08705982.0 dated Dec. 29, 2010, (4 pages).

Current Claims of European Application No. 08705982.0. (5 pages).

Canadian Patent Office, "Office Action", app. No. 2,644,904, dated Aug. 3, 2010, 2 pages.

Claims, Canadian app No. 2,644,904, 7 pages.

Canadian Office Action received in Canadian application No. 2,644,904 dated Jan. 31, 2011 (2 pages).

Current Claims of Canadian application No. 2,644,904 dated Jan. 2011 (7 pages).

Microsoft Windows XP version 2002 screen shot showing controls disabled be admin (1 page).

Australian Patent Office, "Office Action" Application No. 2008206204, Applicant: Coupons.com, Dated Jun. 17, 2011, 4 pages.

Current Claims in Application No. 2008206204, Applicant: Coupons.com, 2 pages, dated Jun. 2011.

Australian Office Action received in Application No. 2008249235 dated Sep. 21, 2011, 2 pages.

Australian Current Claims in Application No. 2008249235 dated Sep. 2011, 7 pages.

U.S. Appl. No. 12/016,160, filed Jan. 7, 2008, Final Office Action, mailed Nov. 30, 2011.

U.S. Appl. No. 12/465,634, filed May 13, 2009, Office Action, mailed Dec. 1, 2011.

U.S. Appl. No. 13/043,238, filed Mar. 8, 2011, Office Action, mailed Sep. 19, 2011.

U.S. Appl. No. 13/043,238, filed Mar. 8, 2011, Final Office Action, mailed Nov. 8, 2011.

U.S. Appl. No. 12/016,165, filed Jan. 17, 2008, Final Office Action, mailed Nov. 28, 2011.

"Notification of Transmittal of the International Search Report and the Written Opinion of the International Searching Authority, or the Declaration" received in PCT Application No.: PCT/US11/29074 dated Nov. 28, 2011 (13 pages).

Current Claims of PCT Application No.: PCT/US11/29074 dated Nov. 2011 (6 pages).

Canadian Office Action received in Application No. 2,672,294 dated Dec. 5, 2011 (3 pages).

Current Claims of Canadian Application No. 2,672,294 dated Dec. 2011 (7 pages).

* cited by examiner

SYSTEM AND METHOD FOR CONTROLLING USE OF A NETWORK RESOURCE

TECHNICAL FIELD

Embodiments described herein relate to a system and method for controlling use of a network resource.

BACKGROUND

Numerous applications benefit from the ability to make an identification of a terminal over a network. Some typical conventional approaches attempt to identify a terminal through use of cookies, data crumbs, or registry entries or software. While such approaches are often effective, they are problematic. Network services that download data or files to a user computer raise issues of privacy concerns. Sometimes, such data inadvertently exposes security threats on the user's terminal. Additionally, cookies, data crumbs and registry entries can typically be altered by a user, making their use too unreliable for some applications.

DETAILED DESCRIPTION

Figure 1:
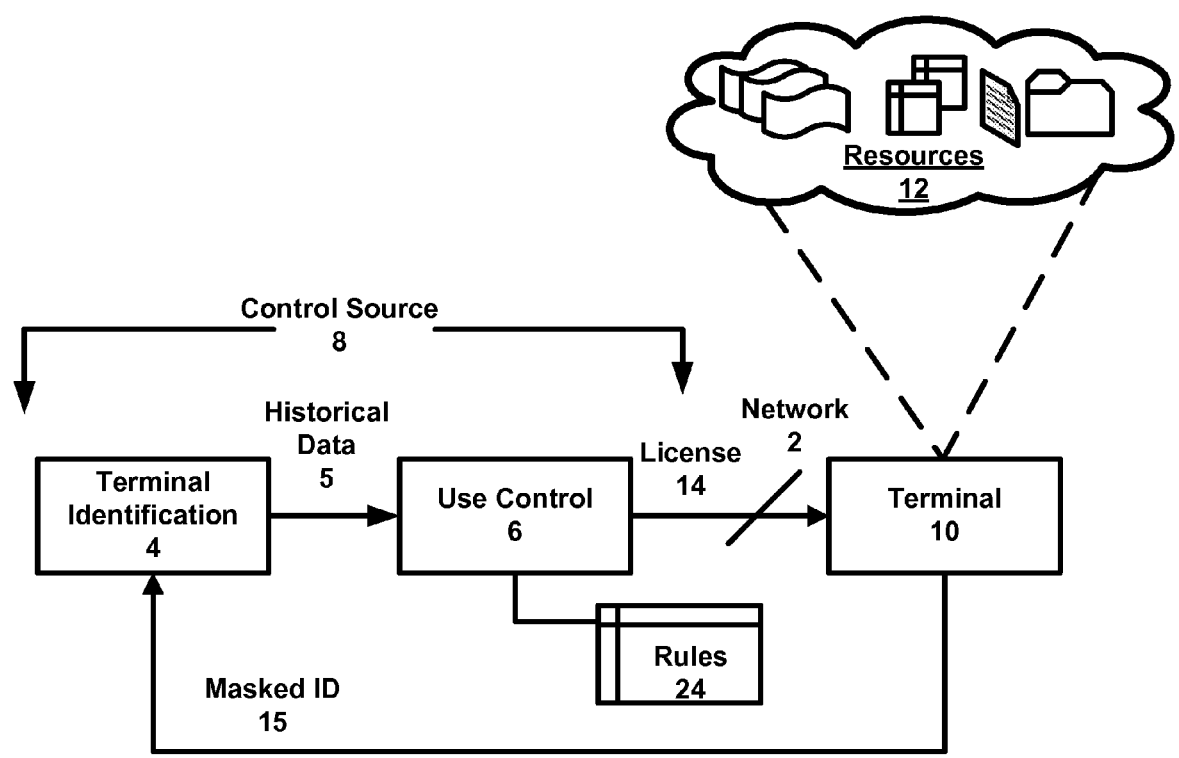
FIG. 1 is a simplified block diagram of processes or components that provide a system for controlling use of a resource, according to one or more embodiments described herein.

Embodiments described herein enable a terminal or device to be anonymously identified by a service or machine using attributes of the device that are persistent and reliable identifiers. Such attributes may serve as markers that can identify the terminal to a service in a reliably unique manner. At the same time, such attributes may be used in a manner that safeguards identifying and private information of the terminal from the service or remote source that is making the identification. In this way, embodiments described herein enable terminals to be identified anonymously, using persistent and reliable identification information of the terminal. This identification information is safeguarded and not shared outside of the terminal.

Numerous embodiments detail that terminals or user machines may be "identified". Unless otherwise stated, such identification is intended to maintain anonymity and privacy of the user, in that identifying information about the user of the terminal may not be determinable from the terminal identification. Some embodiments provide that signatures or signature data used to identify the terminals or hashed one-way, so as to maintain anonymity and privacy, while precluding backward identification of the terminal.

One or more embodiments include a system for controlling use of a network resource. A system includes a control source that is provided on a server and control logic that executes on a terminal. The control logic executes on a terminal to (i) identify a plurality of attributes on the terminal, the attributes including an identifier for each of a plurality of terminal assets that include one or more of a hardware fixture, firmware, or operating system; and (ii) generate signature data from the plurality of attributes. The control source is configured to make a determination from the signature data as to whether the terminal is known or unknown.

In another embodiment, a server is specialized or configured to controlling use of a resource over a network. The server provides control logic that is made available on the network to control use of the resource. The server enables each of a plurality of terminals that execute the control logic to request use of the resource. The control logic may be configured to operate on each of the plurality terminals in order to (i) generate, for each terminal, signature data that identifies that terminal, wherein the signature data is based on a plurality of terminal attributes, and (ii) communicate the signature data to the server. The server is able to make an identification determination of each of the plurality of terminals. For each of at least some of the plurality of terminals, the identification determination is performed without use of cookie data or data footprints that would otherwise reside on the terminal. Responsive to receiving a request to use the resource from any of the plurality of terminals, the server uses the identification determination of that terminal to enable or deny a specific use of the resource.

Still further, another embodiment provides for controlling a terminal in using a resource, the terminal control being performed by a combination of processor and memory or specialized configuration on a terminal or server. In an embodiment, a terminal is programmatically scanned for one or more attribute identifiers, including attribute identifiers of one or more hardware fixtures. Signature data is generated based in part from the one or more attribute identifiers. A determination is made on a control source that is remote to the terminal (i.e. server or service), as to whether the terminal is known or unknown to the control source. The determination is made using the signature data. From the control source, a print operation is controlled by the terminal on the resource.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

Any of the embodiments described herein may be implemented using modules. A module may include a program, a subroutine, a portion of a program, or a software component or a hardware component capable of performing one or more stated tasks or functions. As used herein, a module can exist on a hardware component independently of other modules, or a module can be a shared element or process of other modules, programs or machines.

Furthermore, any embodiments described herein may be implemented through the use of instructions that are executable by one or more processors. These instructions may be carried on a computer-readable medium. Machines or modules shown in figures provide herein include examples of processing resources and computer-readable mediums on which instructions for implementing embodiments of the invention can be carried and/or executed. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Overview

FIG. 1 is a simplified block diagram of processes or components that provide a system for controlling use of a resource, according to one or more embodiments described herein. A system may be implemented as a network service or control source 8 to control usage of a particular resource 12 by terminals 10. Embodiments described herein may be implemented to control use of numerous types of resources, media, data stores, documents or programmatic resources. The particular resource that is to be controlled may be available to the terminal 10 over a network such as the Internet. The type of use that is controlled by control source 8 may vary depending on the type of resource or implementation. For example, in one embodiment, the resource 12 corresponds to a coupon presentation offer, offered at a network site. A user can select to render or view information about the coupon offer. Usage of the coupon offer corresponds to the user creating a print coupon. The printed coupon can be exchanged as currency when purchasing a designated good at a merchant location. In the case of coupons, one or more embodiments provide that the type of use that is controlled is printing. Specifically, embodiments described herein prevent overuse of coupons, by for example, precluding individual terminals from printing one coupon more than a designated limit. More generally, embodiments described herein may be implemented to control various types of usages, including manual or programmatic actions that can be initiated on terminals 10.

According to an embodiment, the control source 8 implements processes of terminal identification 4 and use control 6. Terminal 10 may communicate with the control source 8 in order to receive license or access to use resource 12. As described, the control source 8 is able to make a local identification of terminal 10, meaning the identification is not meaningful outside of the domain control source 8. In this way, the identification made by the control source 8 is private, and the control source 8 is not made privy to any identification or unique data that actually resides on the terminal. Rather, an embodiment provides that the control source 8 is able to identify the terminal 10 for purpose of determining whether it has historical data on the terminal 10, such as historical data of its past interactions with the terminal 10 or past usages of resources 12 by the terminal.

In an embodiment, terminal 10 is configured to identify itself to the control source 8 by signaling masked identifier 15. The masked identifier 15 (i) distinguishes the terminal from all other terminals (to a threshold degree of statistical certainty) that communicate with the control source or use the network resource 12, and (ii) masks (e.g. hashes or encrypts) identifying information that actually resides on the terminal 10. In an embodiment, the terminal 10 is configured to generate masked identifier 15 from persistent terminal identification data. This data is hashed on the terminal 10 prior to being communicated to the control source 8. As described with other embodiments, the persistent terminal identification data may correspond to data that is affixed to hardware, firmware, and/or the terminal's operating system (sometimes collectively referred to as 'assets'), so that it is substantially beyond access of the user to alter or manipulate without significantly altering the terminal. Still further, as described in greater detail, some embodiments provide that the control source 8 is capable of identifying terminal 10 even when the user alters assets of the terminal which result in portions of the identification data being changed. These asset alterations may correspond to the user making a material adjustment to the physical or software state of the terminal, such as replacing a hard drive or re-installing the operating system.

The terminal identification 4 component may use the masked identifier 15 to determine whether the control source 8 'knows' the terminal 10. Historical data 5 may be communicated to use control 6. The historical data 5 may include data that specifies (i) whether the terminal 10 has previously communicated with the source 8 or used resources 12, (ii) frequency of identification of specific resources that were previously used. The use control 6 may reference the historical data 5 against usage rules 24 that govern the usage of resource 12. In an embodiment, control source 8 applies usage rules 24 to the historical information 5 in order to determine whether conditions or criteria for the terminal 10 using the resource 12 are met. If the usage rules 24 provide that the conditions or criteria are met, use control 6 enables a particular usage operation to be performed. Else, the use control 6 may preclude (or not enable) the particular usage operation.

In one embodiment, each resource 12 is encoded so that at least certain types of use requires receipt of a license 14 (e.g. encryption key). The use control 6 may perform processes that either signals or withholds license 14 from terminals 10, depending on the outcome of its determination using the historical data 5 and the usage rules 24. The control source 8 may signal data representing license 14 to terminal 10 when certain conditions or criteria are present. As an alternative or variation, the resource 12 may be enabled for use as default, and the terminal control 6 may signal to disable the ability of the resource 12 to be used by the terminal.

Implementation Scenarios

Embodiments such as described with FIG. 1 and elsewhere in this application may be implemented in various scenarios. The use of numerous types of resources may be controlled using embodiments described herein. The resources may correspond to documents, program files, media files or sources, or data. Specific examples of resources that may be controlled with embodiments described herein include web pages, document media (such as FLASH or HTML media for displaying advertisements), media files, web sites, or program files. The following illustrate implementations of various embodiments described herein.

Embodiments described herein enable control of coupon offers and coupon usage through an online medium such as the Internet. In an embodiment, coupon offers may be presented to users on a web page or media. In order to protect against overuse of a particular coupon, each terminal that uses the coupon offer may be 'identified' in a manner described. Usage rules 24 may be implemented to preclude the user from printing a particular coupon offer beyond an allotted number.

As an alternative, an embodiment may control terminal 10 in rendering or accessing a web page, or web media (such as a banner advertisement). The terminal may be "identified" to preclude the terminal from repeatedly accessing the same web page or advertisement. Such an embodiment may preclude click-fraud, the practice by which terminals 10 are operated to repeatedly select web pages or advertisements in order to build statistics that either facilitate or damage one of the parties involved in providing the web page or advertisement.

As another variation, an embodiment may provide an alternative to a user having to login with a login or password. The terminal identification may automatically grant the user access to a website or an online account.

Various other embodiments provide for controlling, for example, the use or sharing of copyrighted or protected materials, such as documents or media files. Specific actions that may be controlled include the ability of the user to render or playback a media resource, to save a file, or to email or upload a file to a network location. Numerous other implementations and variations are also possible.

System Architecture

Figure 2:
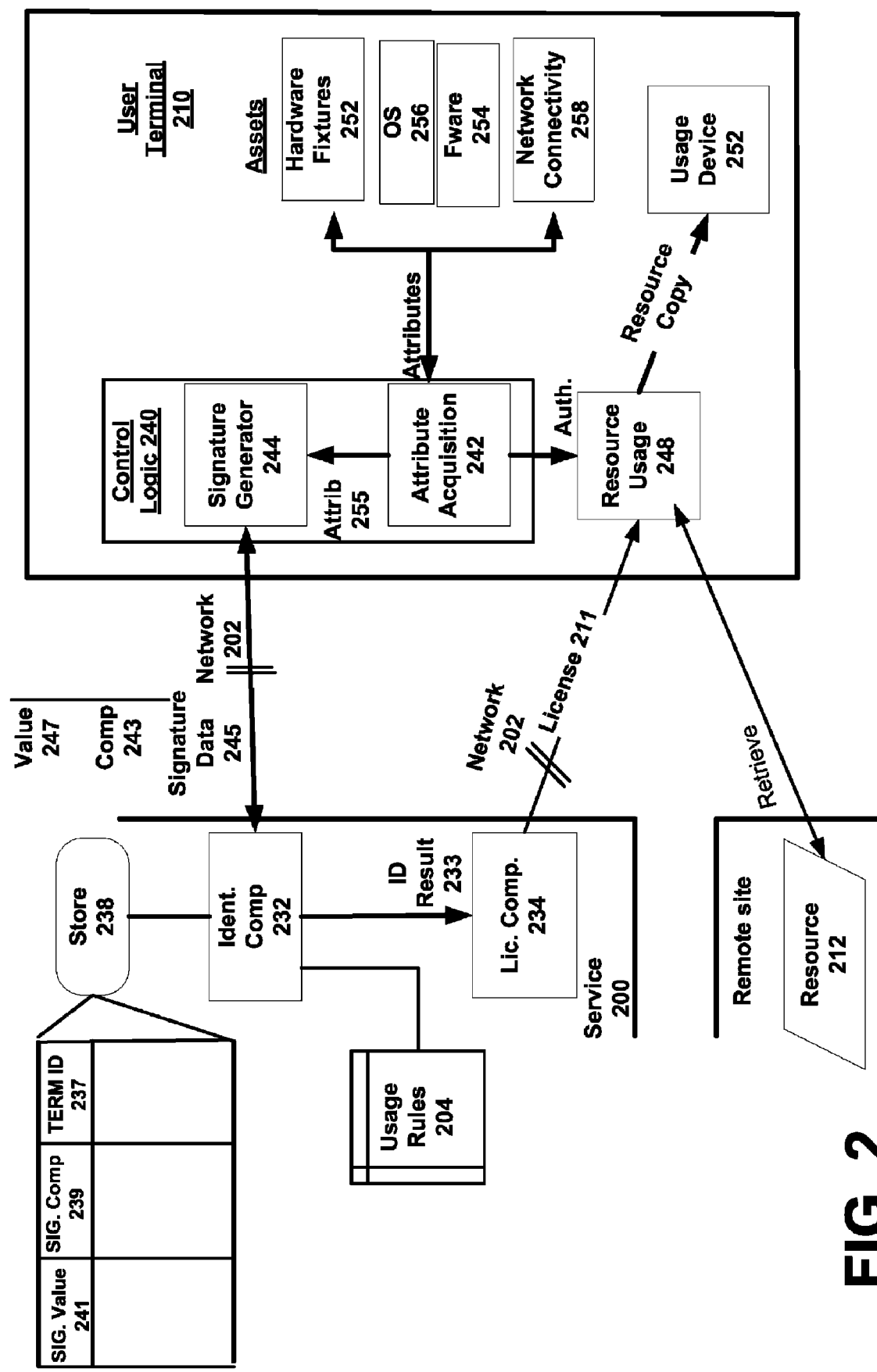
FIG. 2 illustrates a system for enabling controlled use of resources by users on a network, according to one or more embodiments.

FIG. 2 illustrates a system for enabling controlled use of resources by users on a network, according to one or more embodiments. One or more embodiments may be provided in connection with a service 200 that publishes, presents, monitors or otherwise provides resources 212, which are made available to terminals 210 of a given population over a network 202. For example, the resources 212 may be provided at a site that is part of the domain of the service 200. Alternatively, the resource 212 may be hosted or provided at a remote site, such as by a third-party. In some applications, service 200 is made available to terminals 210 that are assumed to represent households (the assumption being that a family or other household members all use the same computer). With reference to FIG. 2, terminal 210 is representative of other terminals in the population, and may correspond to any network enabled device, such as a personal computer or laptop (such as those that operating a WINDOWS operating system), a mobile device or other computer. The network 202 may include or correspond to a public or wide area data network such as the Internet. The availability or use of the resource may be subject to usage rules or conditions. Service 200 may act as or include a control source, in that it performs programmatic operations that correspond to implementation of a set of usage rules 204 for network resources 212.

The service 200 may be provided by one or more servers or other machines which monitor the usage of the resources 212 over a network such as the World Wide Web. Optionally, service 200 publishes or distributes the resources 212, and then controls use of the resources, as described herein. Thus, service 200 may act as both control source and publication/distribution source of the network resources 212. Alternatively, the service 200 may monitor or control use of resources 212 separate from the publication/distribution source.

According to one or more embodiments, service 200 implements the usage rules 204 based at least in part on historical knowledge that the service has about individual terminals 210. In order to determine whether historical knowledge exists, the service 200 makes a determination as to whether the terminal 210 is one of the terminals on a roster or list of terminals that the service 200 has historical information about or otherwise knows. The historical information may correspond to past interactions that the terminal has with the service 200, the resource 212, and/or the source of the resource 212. If the service 200 has no historical information about the terminal, the terminal is considered new to the service. The determination as to whether historical information exists for the terminal may be implemented as a form of identification that maintains the privacy of the terminal and its users.

In order to enable the service 200 to make the identification determination, an embodiment provides that service 200 distributes or otherwise provides control logic 240 to terminal 210. In one embodiment, the control logic 240 is provided as software, that is downloaded and installed by the terminal 210 and executed automatically in connection with the terminal's use of the resources. Control logic 240 executes on terminal 210 in order to signal information to the service 200 that enables the service to determine whether the particular terminal is on its list of known terminals. This information may include or correspond to the masked identifier 15, described with an embodiment of FIG. 1. More particularly, this information may be in form of signature data that maintains anonymity about the terminal and the user (e.g. the data may be hashed, as described below). In this way, service 200 performs an identification process that includes (i) a determination as to whether the terminal 210 is known to the service 200 (i.e. the terminal has past interactions with the service 200); and/or (ii) determination of specific information about the past interactions or actions, if the terminal is known (e.g. historical information such as described with an embodiment of FIG. 1). In an embodiment, the information determined from the identification process is used to programmatically enable or license use of the network resource 212 by terminal 210, in accordance with usage rules 204 or other criteria.

An embodiment provides that service 200 includes an identification component 232 and a license component 234. The identification component 232 may perform a terminal identification process using data provided from terminal 210. In one embodiment, the identification component 232 receives signature data 245 from the control logic 240 operating on the terminal 210 in order to make the determination as to whether the terminal 210 is known to the service 200. The licensing component 234 uses the ID result 233 of the identification determination to provide a license or key 211 or key (or lock) to an appropriate component of the service 200 to enable (or preclude) use of resources 212.

On the terminal 210, an embodiment provides that control logic 240 includes an attribute acquisition component 242, and a signature data generator 244. A resource usage component 248 may be provided on the terminal 210, and may either be part of the control logic 240 or be controllable by the control logic 240 (at least when the usage component 248 is to use resource 212). The attribute acquisition component 242 is configured to perform attribute scans of separate machine assets, including resources of hardware 252, firmware 254 (e.g. Basic Input/Output System or BIOS) and operating system 256. Specific assets that may be scanned include hardware fixtures. Hardware fixtures are internal components of the terminal that are not normally exchanged or swapped by the user between uses (e.g. hard drive, network card). Network connectivity attributes 258 may also be used (e.g. IP Address). From the terminal assets, the attribute acquisition component 242 determines a set of attributes 255 that are specific to the terminal.

The attributes 255 may correspond to values (e.g. character values) and may include attribute identifiers, attribute information and/or an attribute profile. Attribute identifiers include markers that reliably identify a particular component of the terminal 210 from other components of the universe, at least to a high statistical degree. Examples of attribute identifiers include serial numbers or license codes. The attribute acquisition component 242 may, for example, scan various components of the terminal 210, or interface with operating system components, in order to determine the attribute identifiers that comprise the attributes 255. The attribute 255 may also correspond to less-specific or non-unique, descriptive information about the components of the terminal 210, such as the make, model, or version of individual hardware, firmware or software components of terminal 210. The attribute profile information may be based on the combination of attribute information that may by itself not be unique, but when considered together, is relatively unique to the terminal. For example, the attribute identifier may be based on the combination of the make or model of the user's hard drive, the size capacity of the user's hard drive, and the service pack update of the operating system. When considered together, the attributes that comprise the profile may facilitate some form of identification of the terminal.

One or more embodiments recognize that some attributes 255 of terminal 210 may vary on a given machine over a duration. Such attributes may correspond to the state of the machine (e.g. what devices are connected to it, its network connectivity status etc.) and/or manipulations of the machine that are made by the user (e.g. the user updates the operating system or replaces the hard drive). As described further with FIG. 6 and accompanying examples, embodiments are configured to enable service 200 to recognize terminal 210 even when some otherwise persistent attributes of the machine are changed or altered over time.

The attribute acquisition component 242 communicates attributes 255 to signature component 244, which in turn uses the attributes 255 to generate the signature data 245. In an embodiment, the signature data 245 includes or is based on data items that are attribute identifiers of specific components of the terminal 210. In generating the signature data 245, the signature generator 244 may perform a one-way hash that preserves the privacy of the terminal 210. For example, under one implementation, the signature data 245 corresponds to values of attributes 255 that are hashed, so that the service 200 only recognizes the terminal and its components as one that is known or not known, rather than by information that is a true identity identifier.

An embodiment provides that the signature data 245 is combined into a single signature value 247 that is specific to the terminal 210. In this way, an embodiment provides that the signature data 245 communicates both the signature components 243 and the combined signature value 247 to the service 200 for purpose of enabling service 200 to identify the terminal 210.

According to an embodiment, the attribute acquisition component 242 and signature generator 244 combine to generate the signature data 245 responsively to events such as (i) requests from the user of the terminal 210 to use resources 212, or (ii) requests or events generated from service 200. Thus, the signature data 245 may be generated on-the-fly. In such operation, attribute acquisition component 242 may perform a partial or full attribute scan of the terminal to generate the signature data 245. According to an embodiment, the signature data 245 may be partially dependent on the particular state or condition of the terminal (e.g. what peripherals are plugged in, what components or operating). Thus, the signature value 247 generated from the attributes of terminal 210 at one instance is not necessarily the same as the signature value at a past instance, as some of the attributes of the terminal 210 may change with events or time. As described, system 200 may be configured to identify the terminal 210 as one that is known, even when the signature 247 is different than any other signature that is otherwise known the service 200.

Because the attribute acquisition component 242 relies on the attributes of assets, the service 200 does not need to rely on cookie data or footprint data that resides on the terminal. Cookie data may include crumbs or files (e.g. "cookies") that reside on the terminal and are viewable from remote sources through the user's web browser. The footprint data may correspond to registry entries, data entries or manipulated data (including altered file extensions or registry entries) that is made to reside on a terminal through a terminal's web browser or online activities or communications. Reliance on such cookie or footprint data is undesirable, as such data is intrusive and has stigma associated with privacy concerns. Also, such data can be accessed and manipulated by sophisticated computer users. In contrast to such conventional approaches, control logic 240 is capable of executing on the terminal 210 to generate a programmatic identifier of the terminal, independent of registry entries, cookies or other crumbs or data footprints.

Figure 4:
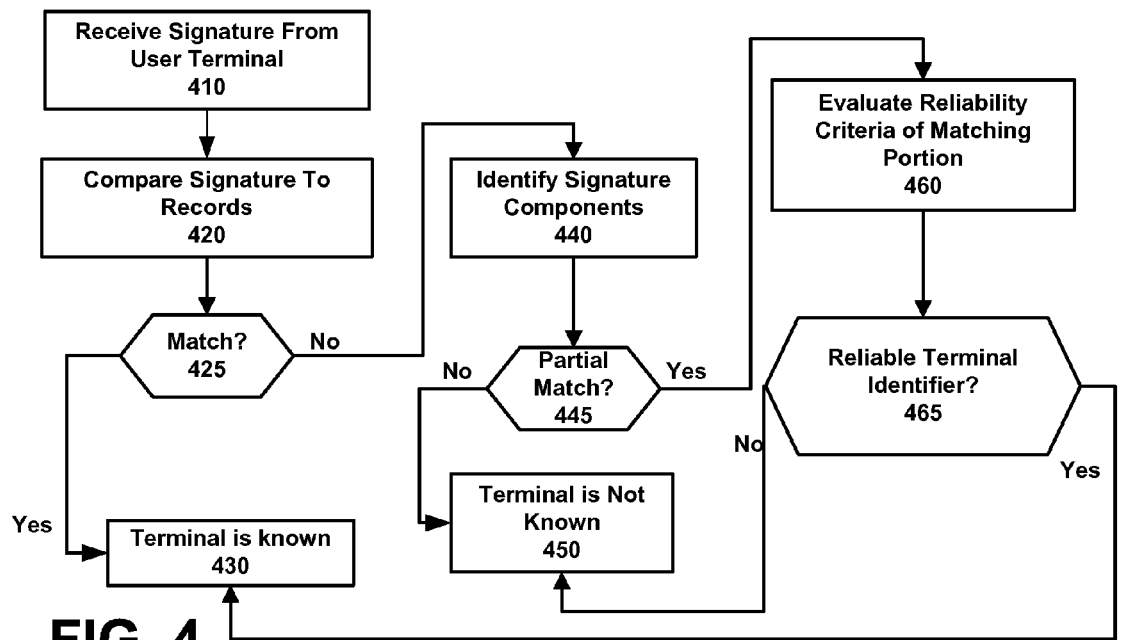
FIG. 4 illustrates a method that may be performed on a server in order to control the use of a resource on a terminal, according to another embodiment.

As mentioned with an embodiment of FIG. 4, the signature generator 244 encrypts or hashes some or all of the signature data 245 before it is transmitted to service 200. The hash may be one-way, so that it is not reversible form the service 200 to determine true values from which the signature data 245 is based. Thus, a true identity of the user or the terminal being used is not revealed to the service 200. But the service 200 is able to make a determination of programmatic identity, based on attributes of the device that may change from instance to instance.

In an embodiment, the identifier component 232 of service 200 receives the signature data 245 (in hashed form) to make a determination as to whether terminal 210 is known or not known (without learning information about the user of the terminal). In this regard, the terminal identification component 232 may perform terminal identification processes such as described with an embodiment of FIG. 1. In one embodiment, service 200 maintains a data store 238 that lists terminal identifiers (e.g. programmatic data identifiers) with known signature values 241 and signature components 239. The same data structure 238 may be used to list historical interaction or use information which may be used to evaluate usage options of the user for a requested action. For example, the data structure 238 may list a terminal identifier 237, (hashed) signature data for that terminal identifier 239, a (hashed) signature value for that terminal 241, and a list of past usages of the resource 212 or other similar resources. This and other information may be applied against the usage rules 204 in order to enable the licensing component 234 to generate its license or instruction. In an embodiment, the identifier component 232 compares the hashed signature value 247 as received from the terminal 210 with corresponding signature values 241 of known terminals in order to determine the terminal identification 237 (which is hashed). As an addition or alternative, other embodiments described herein provide that the received signature components 243 are used to make the identification of the terminal even when the received signature value 247 does not match an entry of the data structure 238. As mentioned, the attributes of the terminal 210 may change, and this may change some of the signature components 243 and the signature value 247. As explained with an embodiment of FIG. 4 and FIG. 6, in such scenarios, the signature components 243 are evaluated against corresponding signature components of other known terminals to identify if any other known terminals match attribute identifiers or other attribute information contained in the signature data that is transmitted to the service 200. As further described with embodiments of FIG. 5, weights or other reliability criteria may be applied in order to determine or estimate how reliable an identifier a combination of hashed signature components 243 is when the overall hashed signature value 247 is not known. The basis of the reliability criteria may be a measure of the uniqueness of the attribute information/identifier or combination.

According to embodiments, identifier component 232 returns results that, may generally be characterized as one of the following: (i) terminal 210 is not known or 'new'; (ii)

terminal 210 is known (e.g. TERM ID 237), and there are no usage restrictions; or (iii) terminal 110 is known and there are usage restrictions. Whether there are usage restrictions are based on what the usage rules 204 govern for when the terminal is known (which may be based on historical information recorded in the entry for the known terminal) and when the terminal is unknown.

Licensing component 234 responds to the determination of the identifier component 232 by communicating an instruction or license to the usage component 248 on the terminal 210. As such, licensing component 234 may be implemented as the use control process or component described with an embodiment of FIG. 1. Depending on the usage scenarios, the instruction or license from the licensing component 234 may vary. In one implementation, the usage control 248 responds to the license or key 211 by retrieving or accessing the resource, and communicating the resource to a usage device 252 (e.g. printer). In the example shown, for example, device 252 may correspond to a printer, and the resource 212 may correspond to a coupon offer presentation that is downloaded and transformed into a print coupon by a print operation (the usage action). The result is, for example, a coupon that the user can apply at a point-of-sale.

While numerous implementations are considered, an embodiment described may pertain to scenarios of implementing controls on the usage of the network resources 212 in order to prevent over-use. The limit to the usage of the resources may be set by the business or usage rules. Unless over-use occurs, licensing component enables (or does not preclude) use of the resource 212 by the usage component 248. Thus, a never before identified terminal (e.g. new user or household to service 200) may be enabled to use the resource 212. Likewise, a known terminal that has not over-used may also use the resource 212. But a terminal 210 that is known and which has exceeded its usage limit may be precluded by the licensing component 234 from using the resource. For example, in the case of online distribution of coupon offers and coupon redemption, there may be a redemption limit as to the number of instances a user may print or redeem a given coupon. If the service 200 identifies the terminal 210 as being known and past its usage limit, the programmatic identifier, along with other information associated with the identifier, is returned to the licensing component 234. In one implementation, the licensing component 234 enables use of the resource 212 by signaling a key or code that enables the terminal 210 to unlock use of the resource 212. If usage is denied, the key or code may not be provided.

In an embodiment, the licensing component 234 uses the usage rules 204 to determine what and/or whether permission is to be given to a terminal 210 to perform a given usage function. In the case of coupon usage, for example, control logic 240 may be implemented as or with a print driver as the usage component 248. This component may be signaled to enable the user to access the coupon presentation offers and to print coupons using the print driver.

Usage Scenarios

Embodiments such as described may be implemented in order to enable service 200 to control use of various types of network resources 212. As mentioned above, for example, the network resources 212 may correspond to electronic coupon presentations, which include coupon offers that can be accepted and/or converted into coupons for price reductions of merchandise. Thus, the resources 212 may correspond to electronic coupon presentations that can be printed into coupons for redemption at a merchant. In such an implementation, the licensing component 234 signals a print driver as the usage component 238. The usage operation or action may correspond to a print selection by the user. The print driver may then cause the corresponding coupon to be printed by a user printer.

In this context, if service 200 identifies the terminal 210 as an unknown, then no restrictions may be placed on the print operation when requested by the user. The licensing component 234 may signal the license or key 211 to enable the terminal 210 to print the coupon. If, however, the service 200 identifies the user as known, then the usage rules 204 may affect whether the user can perform the print operation. In the context of coupons, coupon issuers or sponsors often provide restrictions on the number of instances that the coupon can be printed by a given household (which can be assumed to be the terminal). If, for a given coupon, the user's request to print the coupon causes the household to exceed the restriction, the licensing component 234 may preclude the print operation by not providing the license or key 211. More details of similar usage scenarios are provided with an embodiment of FIG. 7.

As an alternative or addition, the resources may correspond to other forms of commercial currency, such as rebate offers, customer loyalty "cards" (or electronic counterparts) and gift receipts.

Still further, the resources may correspond to documents or files, such as for web pages, advertisements or applications. As an example, the resource 212 may correspond to an advertisement or sponsored link. The use of such resources 212 may be controlled to preclude "click-fraud". Click-fraud refers to a fraudulent practice where users or machines repeatedly click links on the premise that each click triggers a charge to the sponsor of the link. Typical situations where click-fraud arises include in the context of search engine results. When search engine results are presented to the user, sponsored links may also be provided. These links are usually paid for by the sponsor, and each instance that there is a 'click' (i.e. a user-selection) can correlate to a charge to the sponsor. Likewise, advertisement links may also be charged to the advertiser on a per-click bases. Each time a user in the public clicks the advertisement, a charge is made against the sponsor of the advertisement.

In such an implementation, the control logic 240 executes to enable the terminal 210 to be identified when the terminal attempts to select an advertisement or sponsored link. If the terminal 210 is known, some history may exist as to whether that terminal previously or just recently made the same or similar link selection. For example, the terminal may select numerous sponsored links in a short duration, or the same sponsored link more than once or twice. In the context, such uses may be contrary to the usage rules 204. Thus, if such a determination is made, the link selection may be denied.

In another embodiment, system 200 may be implemented in the context where the resource 212 corresponds to media files, such for music, video or images. In this context, terminals may be identified in order to ensure that playback, rendering or other use of the media file is authorized or in accordance with the digital rights associated with the media file.

More generally, an embodiment such as described with FIG. 2 may be implemented in the context of determining whether any user is permissively or rightfully accessing or using any resource 212. As a specific example, the service 200 may utilize the terminal identification process described as a form of an anonymous login.

Methodology

Figure 3:
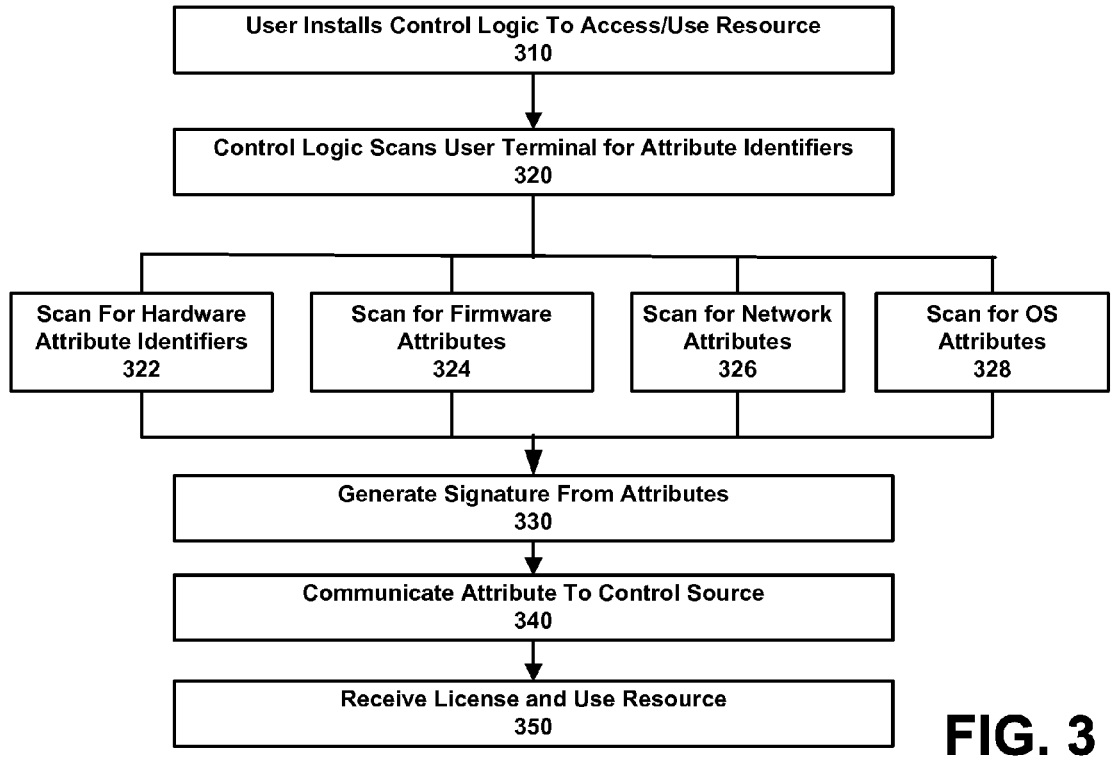
FIG. 3 illustrates a method that may be performed on a given terminal in order to enable a service or other control source to control the terminal's use of a network resource, under an embodiment.

FIG. 3 illustrates a method that may be performed on a given terminal in order to enable a service or other control source to control the terminal's use of a network resource, under an embodiment. FIG. 4 illustrates a method that may be performed on a server in order to control the use of a resource on a terminal, according to another embodiment. In describing the methods, reference may be made to elements of FIG. 2 for purpose of describing a suitable element for performing a step or sub-step that is being described.

With reference to FIG. 3, step 310 provides that the control logic 240 is installed on the user's terminal 210. In an embodiment, the control logic 240 may be provided as a program that is downloaded through the user's web browser and is then installed on the user's machine. The download and installation may occur when the user accesses a website where the resources 212 are provided.

Step 320 provides that control logic 240 scans the user terminal 210 for attributes 255. The scan may be performed in response to a designated event. The designated event may correspond to, for example, the user requesting to perform a usage operation on the resource 212. Thus, each user's request for resource 212 may trigger the control logic 240 to perform the scan. As an alternative or addition, the scan may be performed on a scheduled or calendar basis. Still further, an embodiment provides that the control source or service 200 may request the scan to be performed.

Performance of step 320 may include sub-step 322, which provides for scanning one or more hardware components of the user. Examples of such hardware components include (i) hard drive, (ii) attached peripheral device (any device attached through the port of the machine), (iii) MAC device. Specific attributes that may be determined include the serial number of the components, the size or capacity, the manufacturer name, the date of installation, or the product key.

As an alternative or addition to sub-step 322, sub-step 324 provides for performing the attribute scan on the firmware components of the terminal 210. The firmware components may include, for example, the Basic Input/Output System (BIOS) of the user (for WINDOWS based PCs). The attributes may correspond to metadata associated with the BIOS.

As another alternative or addition, sub-step 326 provides for performing the attribute scan or identification on network elements or connections of the terminal 210. These may include, for example, the IP address of the terminal when connected to the Internet and the MAC address of the network interface of the terminal.

As still another alternative or addition, sub-step 328 provides for performing the attribute scan or identification process on the operating system of the user terminal 210. Attributes that may be identified include, for example, the registration code or product key, the installation date, the date of the installation of a most recent service pack, and/or version information.

Once the attributes are determined, step 330 provides for generating the signature data 245 from the attributes. As mentioned, the signature data 245 may include a single signature value 247 which combines various attributes. Additionally, the signature data 245 may include components 243 which individually identify or are descriptive of individual components of terminal 210. In this regard, the signature data 245 may be signaled as a matrix or set of values.

Step 340 provides that the signature data 245 is communicated from the terminal 210 to the service 200 or control source. In order to preserve anonymity by terminal 210 (and its user), signature 245 may be subjected to a one-way hash before being communicated to the control source (service 200). Thus, the recognition performed by the control source may be based on hashed values.

Assuming the signature data 245 results in no restrictions on the use of resource 212, step 350 provides that the terminal receives the license or key 211 from service 200. In one implementation, the terminal signals the license to a component of the service. The service 200 then uses the historical information and the usage rules to permit or deny the user's access to the resource, or to functionality for using the resource.

With reference to FIG. 4, step 410 provides that a component of service 200 (acting as the control source) receives the signature data 245 from the user terminal.

Step 420 provides that service 200 compares at least a portion of the signature data 245 to a list of signature data values associated with known computers. With reference to FIG. 2, for example, identifier component 232 may parse or otherwise identify signature components 243 (corresponding to signature values from individual combined portions of attributes on user terminal 210) and a combined signature value 247 (for all attributes of user terminal 210) to perform a multistep or multidimensional comparison. In an embodiment shown by FIG. 4, the identifier component 232 initially performs the comparison of step 420 using the signature value 247, which may correspond to a hash value that represents the combination of many or all of the identified attributes of the terminal 210. In step 425, identifier component 232 accesses the data structure 238 to make the determination as to whether any other known terminals have a signature value that matches that of the requesting user terminal 210.

If a match is found, step 430 provides that service 200 records the terminal 210 as being known. Other information, such as historical information recording past usages of the terminal 210, may be retrieved, analyzed and/or used.

If no match is found from the determination of step 425 (using the signature value 247), then an embodiment provides that the service 200 may still identify the terminal 210 as being known. In an embodiment, the identification component 232 of system 200 may rely on a second partial comparison process that is initiated in step 440 to determine if the terminal 210 is known. As mentioned, embodiments recognize that signature value 247 may change for a given terminal. In an embodiment, service 200 uses the signature components 243 of signature data of 245 to identify other known terminals that have corresponding signature components that match that of the requesting user terminal.

If a determination in step 445 is made that no partial match exists, then service 200 determines that terminal 210 is not known to the service 200 in step 450. Thus, terminal 210 would be considered new to the service. An entry recording the signature data (including signature values) of terminal 210 may be created and stored with the data structure 238 so that in subsequent instances, the service 200 is able to identify the terminal as being known.

If, however, a determination is made in step 445 that a partial match exists, then the status of the user may be undetermined. Step 460 provides that the service 200 evaluates the matching signature components to determine whether a reliability threshold is met for relying on the partial match with one or more of the terminals. The reliability criteria may involve identifying which attributes of terminal 210 have matching values, and evaluating the reliability of individual signature components 243 of terminal 210 that have matching counterparts in the data structure 238 of service 200. Further details of how the partial comparison may be performed is described with an embodiment of FIG. 6 and accompanying examples.

A determination is made in step 465 as to whether the matching portion of the signature data is a reliable terminal identifier. If if the partial match of the signature components to one of the known terminals exists and is sufficiently reliable, the terminal 210 is assumed to be the known terminal (step 430). Historical information, such as past usage actions of the user, may be associated with terminal 210 and applied as the service 200 determines whether to control use of resource 212. Else, service 200 assumes the terminal 210 is new (step 450).

Optionally, one or more embodiments provide that a method such as described with an embodiment of FIG. 4 is performed to supplement more conventional identification processes. In one embodiment, control logic 240 may create a data crumb, identify a registry entry or use other data to identify the terminal to the service 200. However, as mentioned, such data is not inherently reliable. Moreover, many users object to privacy or usage issues that arise with such data. Thus, such data may not always be present. In one embodiment, the control source first checks the terminal for a software identifier, such as a cookie. If the identifier is found, the terminal is known. The method is of FIG. 4 is performed if the cookie or soft identifier is not located.

Robust Terminal Identification

Some embodiments described above provide for terminals to signal signatures or identifiers that are based on various terminal attributes that depend in part on the state or conditions of the device or its resources. In this context, embodiments provide for selecting multiple attribute identifiers on the assumption that each terminal will have at least some that are a reliable and persistent basis for identifying that terminal to a service (through, for example, a one-way hashing output). One or more embodiments recognize that the collective use of attribute identifiers provides a persistent and reliable mechanism for identifying a terminal, in a manner that omits use of cookie data, application data or registry entries.

Figure 5:
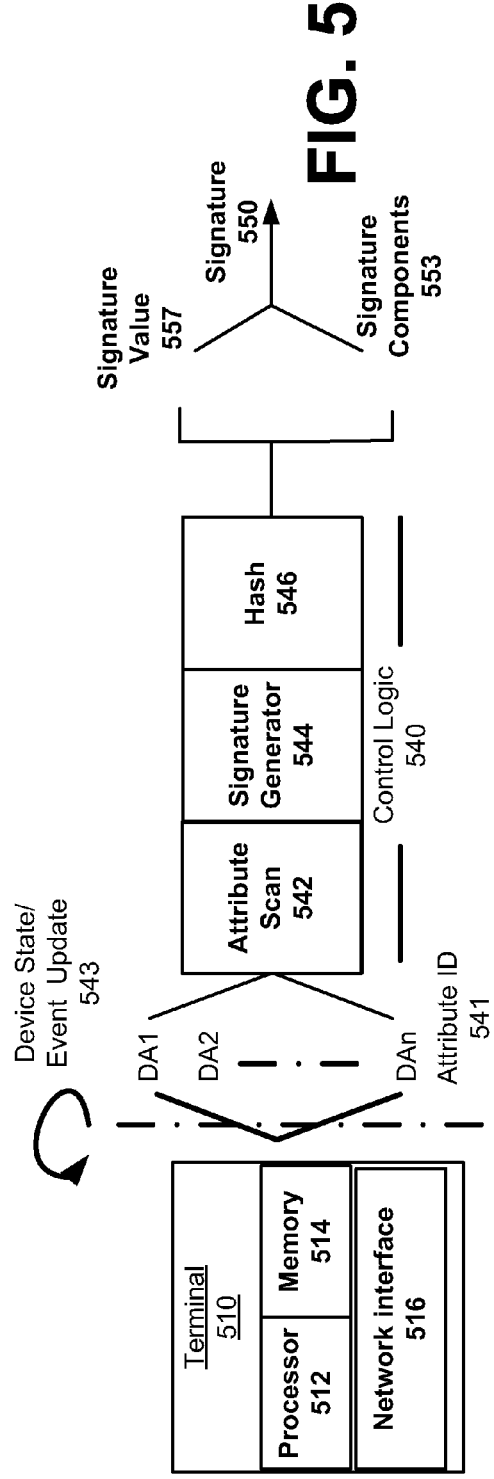
FIG. 5 illustrates a terminal configured to generate a set of signature components and values that reflect attribute values of the terminal at a given instance, under an embodiment.

FIG. 5 illustrates a terminal configured to generate a set of signature components and values that reflect attribute values of the terminal at a given instance, under an embodiment. Such terminal identification may be used to identify the terminal for use with any one of many possible applications, such as coupon offer and redemption applications, click-fraud guard, or digital rights management of media and applications. A control logic 540 may execute on terminal 510 and be implemented in a manner described with an embodiment of FIG. 2. The terminal may include a combination of processor 512 and memory 514 that execute the control logic. In this way, the control logic distinguishes and specializes the terminal 510. A network interface 516 enables the terminal 510 to communicate with a control source or service over a network such as the Internet, and to use resources such as described with various embodiments.

When executed, an embodiment provides that the control logic 540 includes components or processes that correspond to an attribute scanner 542, a signature data generator 544, and a hash 546. The components combine to generate a signature 550. As described, one embodiment provides that the signature 550 has two types of signature data: (i) a signature value 557, = or (ii) a set of signature components 553 that are based on attribute identifiers. The attribute scanner 542 performs an attribute scan to identify a set of attribute identifiers 541 on terminal 510. In one embodiment, the attribute scanner performs a set of API calls to the operating system of the terminal in order to identify the attributes. Values corresponding to the attribute identifiers are used to generate the signature 550. In one embodiment, the signature 550 is formed as a matrix that comprises both (i) individual signature components 553 or sub-sets of attribute values (e.g. see also attribute component 243), and (ii) the collective signature value 557 (e.g. see also signature value 247). Each of the signature component 553 and the signature value 557 may result from performance of a one-way hash 546. Thus, a control source or service may view the signature 550 as a combined value and as its individual parts.

In an embodiment, the attribute scan is performed at each instance that the terminal 510 requests use of a resource that requires the terminal to identify itself to the control source or service (as described with embodiments of FIG. 1 and FIG. 2). The values of the attribute identifiers 541 may be dependent in part on the state 543 or condition of the terminal at the time the attribute scanner 542 performs the scan. Thus, the collective signature value 557 may change from one instance of use to a next. Likewise, some of the signature components 553 may change. However, embodiments recognize that, given sufficient diversity and number in the attributes 541, the values of the attribute components 553 are still usable to detect and identify the terminal with a high degree of reliability. With reference to an embodiment of FIG. 2, for example, when the service 200 receives the signature 545 from terminal 510, it may first seek to determine whether the signature value 557 portion is known. If this portion is not known, the service may compare some or all of the signature components 553 to determine whether identification can be made from the parts of the signature 550.

Thus, at each instance, the conditions may arise that cause one or more of the attribute identifiers 541 to alter as compared to a past instance when the signature 550 was generated. Many of the attribute identifiers 541 may change in response to changes in the state or use of components on the terminal 510. Many of the device states or conditions may change through normal activity. For example, a user may update a network card, or switch wireless mediums (e.g. from WiFi connection to landline or cellular-Internet), attach an accessory device (e.g. Flash memory), or perform an OS upgrade. Any of these activities may alter one or more of the attribute identifiers 541. Furthermore, when a population of terminals are considered, one or more embodiments recognize that some attributes may be reliable identifiers for some machines, but not for others. For example, installation date of an operating system is reliable identifier for consumers, but in a corporate environment, many machines may have the exact same installation date.

Accordingly, one or more embodiments recognize that a control source or service that uses signature 550 may gauge the reliability of the individual components 553 of the signature 550 when the signature value 557 portion is not a match. As mentioned above, however, the reliability of attributes as identifiers may differ based on factors such as the composition of the terminal and the working environment of the terminal.

Figure 6:
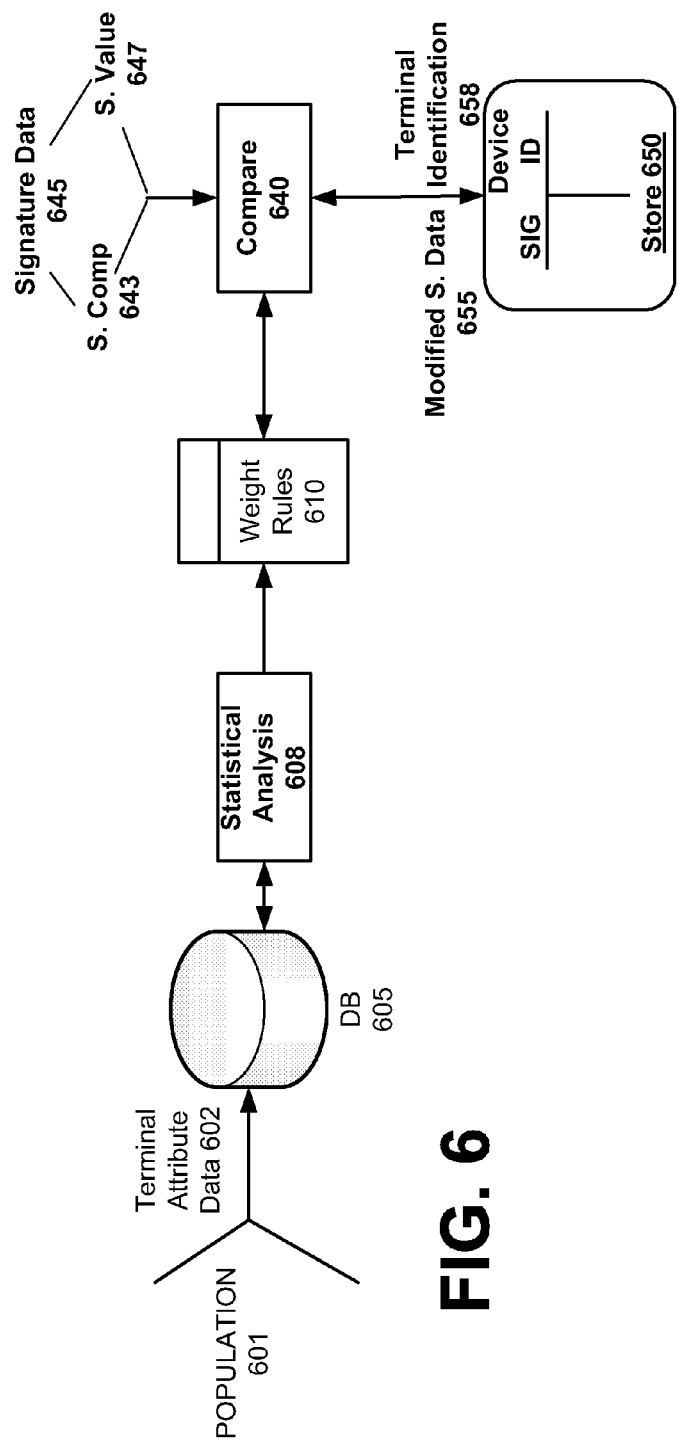
FIG. 6 illustrates a sub-system for enabling attributes that account for signature components to be statistically analyzed reliability, according to an embodiment.

Accordingly, embodiments such as described with FIG. 6 illustrate techniques by which the reliability of signature components 553 may be measured and accounted for in determining whether a combination of signature components accurately identify a terminal.

FIG. 6 illustrates a sub-system for enabling attributes that account for signature components to be statistically analyzed reliability, according to an embodiment. The analysis may be based on various factors that statistically influence the reliability of individual signature components to be both persistent and unique. As described previously, embodiments may rely on identifying individual terminals through signature data that corresponds to, or is based on the attributes of individual terminal components. The components that may form the basis of the signature data may correspond to hardware, firmware or operating system components (collectively termed 'assets'). In FIG. 6, a collection of data 602 representing the value or various terminal attributes of a population 601 may be collected over time. Such data 602 may be stored in a database 605 or other data structure where it may be analyzed. In one implementation, the population is repeatedly sampled or updated to maintain accurate information as to events or occurrences that can indicate how reliable certain attributes are as identifiers. The reliability of individual attributes may be based on determinations of how unique and persistent the attributes are in the population sample. For example, in the case of service 200 (FIG. 2) distributing control logic 242 (FIG. 2) as software to a population, some or all of the population that has the control logic 242 may communicate hashed values of attribute identifiers at various instances. A statistical analysis component 608 or process may statistically compile and analyze data 602 to determine various statistical conditions or occurrences that affect how reliably attributes of specific terminal assets serve as unique identifiers. The statistical analysis may seek to identify how often individual assets have shared or common attribute values, and instances and occurrences when attribute values of specific assets change for terminals in the population.

The sampling and analysis enables the statistical analysis component 608 to generate a set of weighting rules 610. As an alternative or addition, some or all of the analysis performed by the component 608 may be performed by humans.

In one embodiment, each time the control source or service seeks to identify a terminal, the incoming signature data 645 is subjected to a comparison process 640. As noted in, for example, embodiments of FIG. 2 and FIG. 4, the incoming signature data 645 may include signature components 643 and a single signature value 647 (combining some or all of the signature components). Each element of signature data 645 be derived (after hashing) from attributes of specific assets.

The weighting rules 610 are applied to the incoming signature 645, to derive weights for signature data 655. More specifically, the signature data 655 may be assigned values to weight some or all of the signature components 643, to provide greater or less influence to specific signature components 643, based on what the ongoing statistical analysis determines as to the reliability of the individual signature components. The signature data 655 and its determined weighting values may be subjected to an algorithmic comparison process with entries of known terminals in the data store 605. As described in greater detail, the data store 605 maintains entries that reference terminal identification information 658 to elements of signature data 645, as well as to historical data of activities or information about the terminal. The signature data 655 and its weighting values may be used by comparison process 640 as follows:

(i) compare signature value 647 to data store of signature values; if match is found, then the terminal is identified;

(ii) else compare specific signature components 643, with weighting values, to corresponding signature components in the data store 605; match is found when comparison of individual signature components 643 (incoming) is deemed to satisfy a threshold criteria or comparison with signature components of existing entries (representing known terminals). The comparison process 640 uses the signature data 655 with weights to determine terminal identification information 658. The terminal identification information 658 indicates that the terminal is known or not known. If the terminal is known, entries containing historical information about the terminal may be accessible to the service or source that seeks to control a resource.

In more detail, comparison process 640 may be performed as follows. For the signature value 647 or individual signature components 643 (collectively form the signature data 645, as described with embodiments of FIG. 2 and FIG. 4), the service or control source determines whether the number of distinct devices with matching signatures is zero, one, several or many. For each of those results, a probability is assumed for the possibility of false positive or a false negative. The possibilities are analyzed to determine whether, when considered collectively, a threshold is met for eliminating either false positive or false negative error.

Thus, with some embodiments in FIG. 6, a given device may be identified at a first instance, then re-identified at a second instance when there is minimal change to the device state, and then still re-identified after terminal devices or components are altered.

Coupon Distribution and Control

Figure 7:
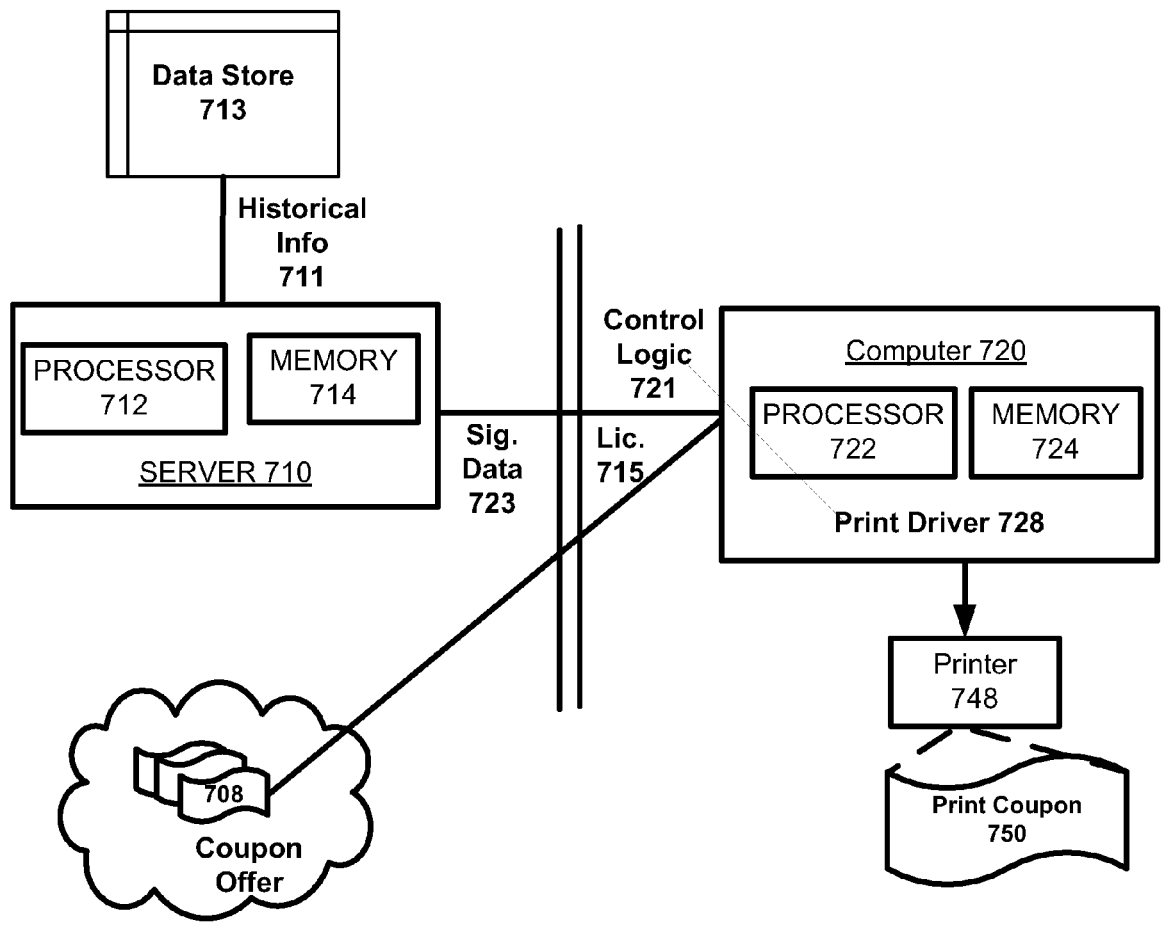
FIG. 7 is a simplified system diagram of a coupon application, in accordance with one or more embodiments described herein.

FIG. 7 is a simplified system diagram of a coupon application, in accordance with one or more embodiments described herein. A system may be implemented between a server 710 and a computer 720 that communicate across a network 702. The server 710 may be provided as part of a service that publishes coupon offers 708 on one or more network sites. The coupon offers 708 may be made available to various segments of the population. Each coupon offer 708 may include or correspond to a file or set of data that can be converted into a printed coupon 750 by the computer 720. The user of computer 720 may perform a print operation using the coupon offer 708 to create the coupon 750. This operation may be performed using a printer 748 that is in communication with the computer 720. Once printed, the user may seek to redeem the coupon 750 at a merchant or point-of-sale. The coupon 750 may include hard security features, such as watermarks and copy-protect features, to safeguard the coupon 750 from being copied or replicated.

Each of the server 710 and the computer 720 may be specialized or otherwise configured with programming and logic to implement features of embodiments described herein. In particular, server 710 may be configured to protect overuse of coupon offers by the computer 720. The printed coupon 750 carries currency value, and its offer may be subject to terms and conditions that server 710 regulates. The terms and conditions may specify, for example, how often the computer 720 can print coupon 750. Other designations can also be made, such as certain coupons can be offered in pairs, or only to heavy users.

Embodiments recognize that in order to maintain value for coupons, strict compliance with the terms and conditions specified with each coupon offer is desirable. In order to promote compliance with the terms and conditions of coupons, the server 710 may need to be aware of past usages of the coupon by the server. At the same time, in order to promote use of the coupons by the public, it is desirable for the server 710 to acquire no information or data that identifies any part of the terminal or user.

Accordingly, a processor 722 and memory 724 resource of the computer 720 may be configured by control logic 721 to generate signature data 723. The control logic 721 may be downloaded and installed, or provided as a session-based functionality. In one embodiment, the control logic 721 is integrated as a print driver 728. In an embodiment, the coupon offers 708 are protected data that can present coupon information, but can only enable the true hard coupon 750 to be created by the specialized print driver 728. The print driver 728 may be compatible with any printer (or print driver), but is configured with proprietary instructions shared by the coupon offers 708 to be the only component that can make print copies. Only the print driver 728 can, for example, recreate the bar codes, images and/or watermarks that make coupon 750 redeemable. When the user is approved, the print driver 728 (or the control logic 721 if separate) may receive a license 715 or enablement key to allow the data of the coupon offer 708 to be used in a print operation to make the coupon 750. Such an implementation of the control logic 721 and signature data 723 may be in accordance with any of the embodiments described herein. Thus, signature data 723 may hash identifying information on the terminal (i.e. attribute identifiers).

The server 710 may also include a combination of processor 712 and memory resources 714 that are configured to implement components and processes described with any of the embodiments described herein. Accordingly, the server 710 uses the signature data 723 to make a determination as to whether computer 720 is known or unknown.

Embodiments provide that the signature data 723 is generated each time the user of computer 720 attempts to perform a print operation on the coupon offer to generate the coupon 750. Still further, an embodiment provides that the computer 720 is configured to communicate cookie or similar data ("soft identification") in certain instances to the server. The instances may be based on user-approval, or on the state of the machine (e.g. the user's browser has a security setting that enables the cookie information to be communicated). In certain instances, however, the computer 720 does not communicate the soft identification (such as by user preference), in which case server 710 uses the signature data 723 before responding to the request to perform the print operation. Either the soft identification or the signature data 723 are used by the server 710 to make the terminal identification (known or unknown). Use of the signature data 723 to make the terminal identification is described in various embodiments, including with embodiments of FIG. 3 and FIG. 4.

If the computer 720 is known, it means that the computer has previously attempted to print coupons from the coupon offers. The server 710 may retrieve historical information 711 from a user data store 713 indicating past instances that the user (assumed to be same as computer 720) has performed the print operation. The number of past instances are compared against usage rules to determine whether the computer 720 can perform another print operation. For example, if the computer 720 has previously printed two or more of the same coupon offers, the third request to perform another print operation on the coupon offer may be denied. Embodiments also provide that if the computer is not known, then the computer 720 is enabled to print the coupon, as overuse restrictions are not violated.

Conclusion

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations

What is claimed is:

1. A system for controlling use of a network resource, the system comprising:
a control source that is provided on a network server comprising a combination of one or more processors and memory resources to communicate with a plurality of terminals in order to control use of the network resource;
a control logic that executes on a terminal comprising a combination of processor and memory resources to identify a plurality of attributes of the terminal, one or more of the plurality of attributes including one or more of an identifier for a hardware fixture of the terminal, an identifier for firmware of the terminal, or an identifier for an operating system of the terminal, and to generate signature data that identifies the terminal based on combining the plurality of attributes; and
wherein the control source is configured to make a determination from the signature data as to whether the terminal is known or unknown;
wherein the control source is configured to enable or allow a requested use of the network resource by the terminal if the determination is that the terminal is unknown;
wherein the control source is configured to deny a requested use of the network resource by the terminal based on the determination being that the terminal is known.

2. The system of claim 1, wherein the control source is configured to identify historical data on the terminal's past use of the network resource in response to determining that the terminal is known, and wherein the control source uses a set of usage rules to determine to enable or allow a requested use of the network resource based on the historical data and the set of usage rules.

3. The system of claim 1, wherein the control logic executes on the terminal to generate the signature data in response to each instance that a user of the terminal requests the resource or requests to use the network resource.

4. The system of claim 1, wherein the control source is configured to selectively signal a license to the terminal in order to enable the terminal to use the network resource based in part on the determination that the terminal is known or unknown.

5. The system of claim 4, wherein the network resource corresponds to an electronic coupon offer, and wherein the control logic is integrated or coupled to a print driver, and wherein the license corresponds to data that enables the print driver to use the electronic coupon offer to generate a print coupon that is redeemable at a merchant site.

6. The system of claim 5, wherein the control source is configured to signal the license when the terminal is unknown, or the terminal is known to have not over-requested the electronic coupon offer more than permitted by one or more usage rules associated with the electronic coupon offer.

7. The system of claim 1, wherein
the control logic executes on the terminal to generate signature data that includes a plurality of signature components, each signature component being derived from a corresponding identifier of one of the assets, a signature value that is based on at least a combination of at least some of the plurality of signature components; and
the control source is configured to make the determination as to whether the terminal is known by comparing the signature value to a known signature value of a roster of known terminals, or if the signature value is not known, using at least some of the plurality of signature components to make a determination as to whether the signature components provide a reliable partial match to corresponding known signature components of terminals on the roster.

8. The system of claim 7, the control logic executes on the terminal to generate signature data that is hashed.

9. The system of claim 7, wherein the system includes a statistical analysis component that analyzes a sampling of signature components from a given population to assign a reliability parameter to individual signature components of signature data of the terminal that the determination is being made.

10. A computer-implemented method, executable on a server, for controlling use of a resource over a network, the method comprising:
making a control logic available on the network to control use of the resource;
enabling each of a plurality of terminals that execute the control logic to request use of the resource;
configuring the control logic to operate on each of the plurality terminals in order to generate, for each terminal of the plurality of terminals, signature data that identifies that terminal, the signature data being based on a plurality of terminal attributes of that terminal, one or more terminal attributes of the plurality of terminal attributes including an identifier corresponding to a hardware fixture of the terminal, an identifier corresponding to firmware of the terminal, or an identifier corresponding to an operating system of the terminal, and to communicate the signature data to the server;

making an identification determination of each of the plurality of terminals, wherein for each of at least some of the plurality of terminals, making the identification determination is performed without use of cookie data or data footprints on that terminal;

responsive to receiving a request to use the resource from any of the plurality of terminals, using the identification determination of that terminal to enable or deny a specific use of the resource by the terminal;

wherein the specific use of the resource by that terminal is enabled if the terminal is unknown;

wherein the specific use of the resource by that terminal is denied based on the identification determination of that terminal being that that terminal is known.

11. The method of claim 10, wherein configuring the control logic includes incorporating instructions into the control logic to cause at least some of the plurality of terminals to individually identify attribute identifiers corresponding to at least two of a hardware fixture identifier, a firmware identifier, or an operating system identifier.

12. The method of claim 10, wherein configuring the control logic includes incorporating instructions into the control logic to cause at least some of the terminals of the plurality of terminals to individually identify attribute identifiers of multiple hardware fixtures.

13. A computer-implemented method for controlling a terminal in using a resource, the method being performed by a combination of one or more processors and memory, the method comprising:

programmatically scanning a terminal for a plurality of attribute identifiers, wherein one or more attribute identifiers of the plurality of attribute identifiers corresponds to a hardware fixture of the terminal, firmware of the terminal, or operating system of the terminal;

generating signature data based in part from the plurality of attribute identifiers;

making a determination, on a control source that is remote to the terminal, as to whether the terminal is known or unknown to the control source, the determination being made using the signature data;

controlling, from the control source, performance of a print operation by the terminal on the resource based at least in part on the determination;

wherein the control source allows performance of the print operation by the terminal on the resource if the determination is that the terminal is unknown.

14. The method of claim 13, wherein generating the signature data includes performing a one-way hash on the one or more attribute identifiers, then communicating the signature data to the control source so that the plurality of attribute identifiers used to generate the signature data are not known to the control source.

15. The method of claim 13, wherein the resource corresponds to an electronic coupon offer, and wherein the method further comprises selectively enabling the print operation to be performed on the electronic coupon offer, so as to enable a user of the terminal to produce a print coupon from the electronic coupon offer.

16. The method of claim 13, wherein making a determination as to whether the terminal is known or unknown includes comparing at least a portion of the signature data to other signatures of known terminals.

17. The method of claim 16,
wherein generating the signature data includes generating multiple signature components that separately correspond to one of the plurality of attribute identifiers, and a signature value based on a combination of at least some of the signature components; and
wherein making the determination includes determining one of the signature value matches a signature value of one of the known terminals, or one or more signature components individually match corresponding signature components of one of the known terminals and are reliable in uniquely belonging to the one of the known terminals.

18. The method of claim 13, further comprising:
responsive to making the determination that the terminal is known, determining historical information about the terminal's past use of the resource, the historical information being determinative of whether the terminal to be enabled or allowed to perform the print operation.

19. A system for controlling use of a resource, the system comprising:

a terminal comprising one or more processors configured to execute logic that causes the one or more processors to:

programmatically scan the terminal for a plurality of attribute identifiers, wherein one or more attribute identifiers of the plurality of attribute identifiers corresponds to a hardware fixture of the terminal, firmware of the terminal, or operating system of the terminal;

generate signature data based in part from the one or more attribute identifiers;

communicate the signature data to a control source over the network;

the control source that is provided on a network server comprising a combination of one or more processors and memory resources and that is coupled to the terminal over the network, wherein the control source is configured to:

use the signature data from the terminal to make a determination as to whether the terminal is known or unknown;

signal instruction data to the terminal to either enable or preclude performance of a print operation based on the determination;

wherein the control source enables performance of the print operation if the determination is that the terminal is unknown.

20. The system of claim 19, wherein the one or more processors of the terminal are further configured to generate the signature data by hashing the one or more attribute identifiers, so that the one or more attribute identifiers are not determinable from the control source.

21. The system of claim 19, wherein the one or more processors of the terminal are further configured to programmatically scan the terminal for one or more attribute identifiers of a firmware or operating system assets of the terminal.

22. The system of claim 19, wherein the resource corresponds to an electronic coupon offer, and wherein the control source is configured to control the print operation to create a coupon from the electronic coupon offer.

23. The system of claim 22, wherein the control source is configured to:

signal the instruction data to the terminal to enable the print operation when the determination is that the terminal is unknown;

determine instances of past print operations on the electronic coupon offer by the terminal when the determination is that the terminal is known, then (a) signal the instruction data to the terminal to enable the print operation if a number of the past instances is less than a predetermined limit, or (b) preclude the print operation if the number of the past instances is more than the predetermined limit.

24. A non-transitory computer-readable medium storing one or more sequences of instructions for controlling use of a resource over a network that, when executed by one or more processors, causes the processors to perform:
   making available on the network a control logic to control use of the resource;
   enabling each of a plurality of terminals that execute the control logic to request use of the resource;
   configuring the control logic to operate on each of the plurality terminals in order to generate, for each terminal of the plurality of terminals, signature data that identifies that terminal, the signature data being based on a plurality of terminal attributes of that terminal, one or more terminal attributes of the plurality of terminal attributes including an identifier corresponding to a hardware fixture of the terminal, an identifier corresponding to firmware of the terminal, or an identifier corresponding to an operating system of the terminal, and to communicate the signature data to a server;
   making an identification determination of each of the plurality of terminals, wherein for each of at least some of the plurality of terminals, making the identification determination is performed without use of cookie data or data footprints on that terminal;
   responsive to receiving a request to use the resource from any of the plurality of terminals, using the identification determination of that terminal to enable or deny a specific use of the resource by the terminal;
   wherein the specific use of the resource by that terminal is enabled if the terminal is unknown;
   wherein the specific use of the resource by that terminal is denied based on the identification determination of that terminal being that that terminal is known.

25. The non-transitory computer-readable medium of claim 24, wherein the instructions that cause configuring the control logic include instructions that cause incorporating instructions into the control logic to cause at least some of the terminals of the plurality of terminals to individually identify attribute identifiers corresponding to at least two of a hardware fixture identifier, a firmware identifier, or an operating system identifier.

26. The non-transitory computer-readable medium of claim 24, wherein the instructions that cause configuring the control logic include instructions that cause incorporating instructions into the control logic to cause at least some of the terminals of the plurality of terminals to individually identify attribute identifiers of multiple hardware fixtures.

27. A non-transitory computer-readable medium storing instructions for controlling a terminal in using a resource, wherein the instructions, when executed by one or more processors, causes:
   programmatically scanning a terminal for a plurality of attribute identifiers, wherein one or more attribute identifiers of the plurality of attribute identifiers corresponds to a hardware fixture of the terminal, firmware of the terminal, or operating system of the terminal;
   generating signature data based in part from the plurality of attribute identifiers;
   making a determination, on a control source that is remote to the terminal, as to whether the terminal is known or unknown to the control source, the determination being made using the signature data;
   controlling, from the control source, performance of a print operation by the terminal on the resource based at least in part on the determination;
   wherein the control source allows performance of the print operation by the terminal on the resource if the determination is that the terminal is unknown.

28. The non-transitory computer-readable medium of claim 27, wherein generating the signature data includes performing a one-way hash on the one or more attribute identifiers and communicating the signature data to the control source so that the plurality of attribute identifiers used to generate the signature data are not known to the control source.

29. The non-transitory computer-readable medium of claim 27, wherein:
   the resource corresponds to an electronic coupon offer; and
   the instructions, when executed by the one or more processors, further cause selectively enabling the print operation to be performed on the electronic coupon offer, so as to enable a user of the terminal to produce a print coupon from the electronic coupon offer.

30. The non-transitory computer-readable medium of claim 27, wherein the instructions that cause making a determination as to whether the terminal is known or unknown include instructions that cause comparing at least a portion of the signature data to other signatures of known terminals.

31. The non-transitory computer-readable medium of claim 30, wherein: generating the signature data includes generating multiple signature components that separately correspond to one of the plurality of attribute identifiers, and a signature value based on a combination of at least some of the signature components;
   making the determination includes determining one of the signature value matches a signature value of one of the known terminals, or one or more signature components individually match corresponding signature components of one of the known terminals and are reliable in uniquely belonging to the one of the known terminals.

32. The non-transitory computer-readable medium of claim 27, wherein the instructions, when executed by the one or more processors, further cause, responsive to making the determination that the terminal is known, determining historical information about the terminal's past use of the resource, the historical information being determinative of whether the terminal to be enabled or allowed to perform the print operation.

\* \* \* \* \*